(No Model.)
E. F. PFLUEGER.
FISH SCALER AND DRESSER.
No. 486,295. Patented Nov. 15, 1892.
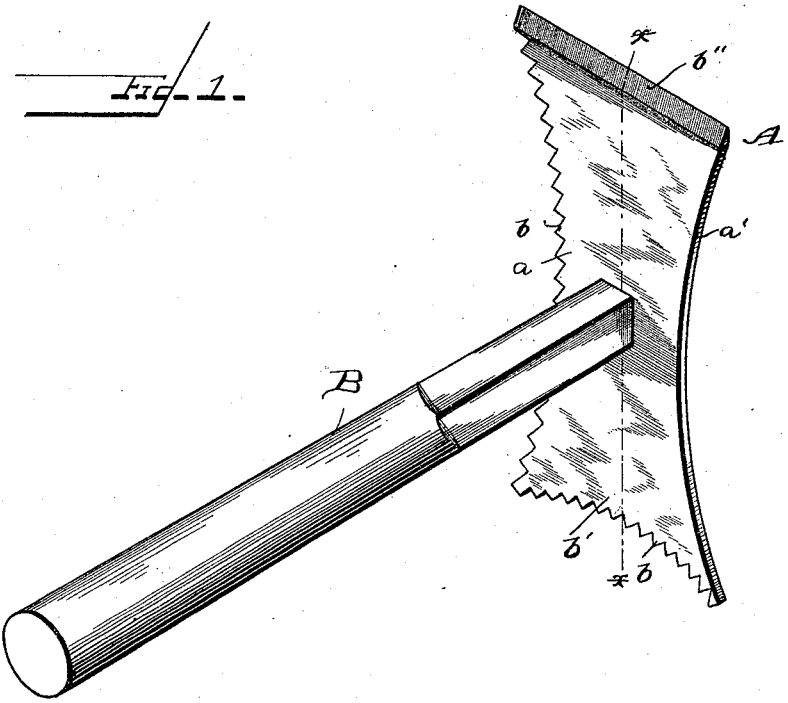
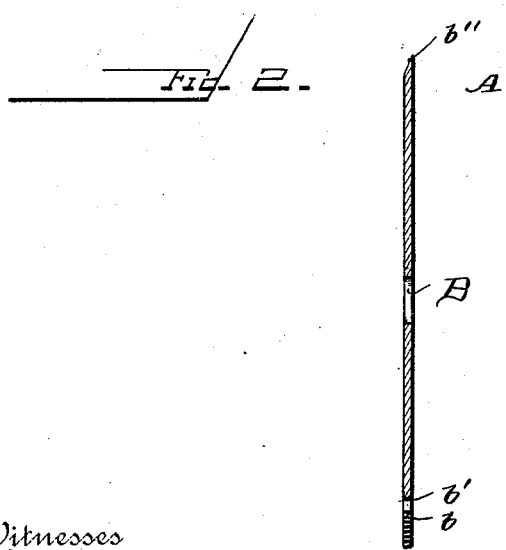
Witnesses
Jesse Heller.
Phil Mass
Inventor
E. F. Pflueger
by E. W. Anderson
his Attorney

UNITED STATES PATENT OFFICE.

ERNEST F. PFLUEGER, OF AKRON, OHIO.

FISH SCALER AND DRESSER.

SPECIFICATION forming part of Letters Patent No. 486,295, dated November 15, 1892.

Application filed January 30, 1892. Serial No. 419,789. (No model.)

*To all whom it may concern:*

Be it known that I, ERNEST F. PFLUEGER, a citizen of the United States, and a resident of Akron, in the county of Summit and State of Ohio, have invented certain new and useful Improvements in Fish Scalers and Dressers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of the invention and is a perspective view. Fig. 2 is a section of the plate or blade, taken on line $x\ x$.

This invention has relation to certain devices for the purpose of scaling and dressing fish; and it consists in the novel construction and combination of parts as hereinafter specified.

In the accompanying drawings, the letter A designates a metallic plate having its lateral edges of concave form, as shown at $a\ a'$. The edge $a$ is formed with a continuous series of saw-like teeth $b$, while the edge $a'$ is plain or beveled, as shown. One end $b'$ of the plate is also concaved and formed with teeth, the other end $b''$ having a sharp cutting-edge.

B is a handle of any suitable form, to which the plate is applied.

The edge $a$ is designed for removing the scales from larger fish or from the larger portion of a fish, while the similarly-toothed end $b'$, which is of less extent, is used for smaller fish or for the tail portions of larger fish. The side portion $a'$ serves for use as a stripper or scale-wiper, and the knife-edged end $b''$ is used for cutting off the head and tail portions. The concave form of the edges $a\ a'$ and the end $b$ allows the teeth to engage a larger surface of the body of the fish at a time and renders the device more efficient.

The device is simple, may be conveniently carried in the pocket or fishing-case, and is easily cleaned, and by its use a fish may be quickly and easily prepared for cooking.

Having described this invention, what I claim as new, and desire to secure by Letters Patent, is—

1. A fish scaler and dresser comprising a metallic plate having its side edges concaved or bowed inwardly toward each other, one of said edges having a series of saw-teeth for removing the scales and the other edge beveled to form a stripper or scale-wiper, a knife or cutter integral with one end portion of said plate, and a concaved toothed portion at the other end, and a handle attached centrally to said plate, substantially as specified.

2. The herein-described fish scaler and dresser, comprising an oblong quadrangular plate having its longer edges curved inwardly and its shorter edges one curved inwardly and the other straight, one of said longer curved edges having teeth formed thereon and the opposite edge beveled to form a scale-wiper, the shorter curved edge also having teeth and the straight edge a cutter, substantially as specified.

In testimony whereof I affix my signature in presence of two witnesses.

ERNEST F. PFLUEGER.

Witnesses:
T. W. WAKEMAN,
HENRY HEEPE.